Patented Nov. 22, 1932

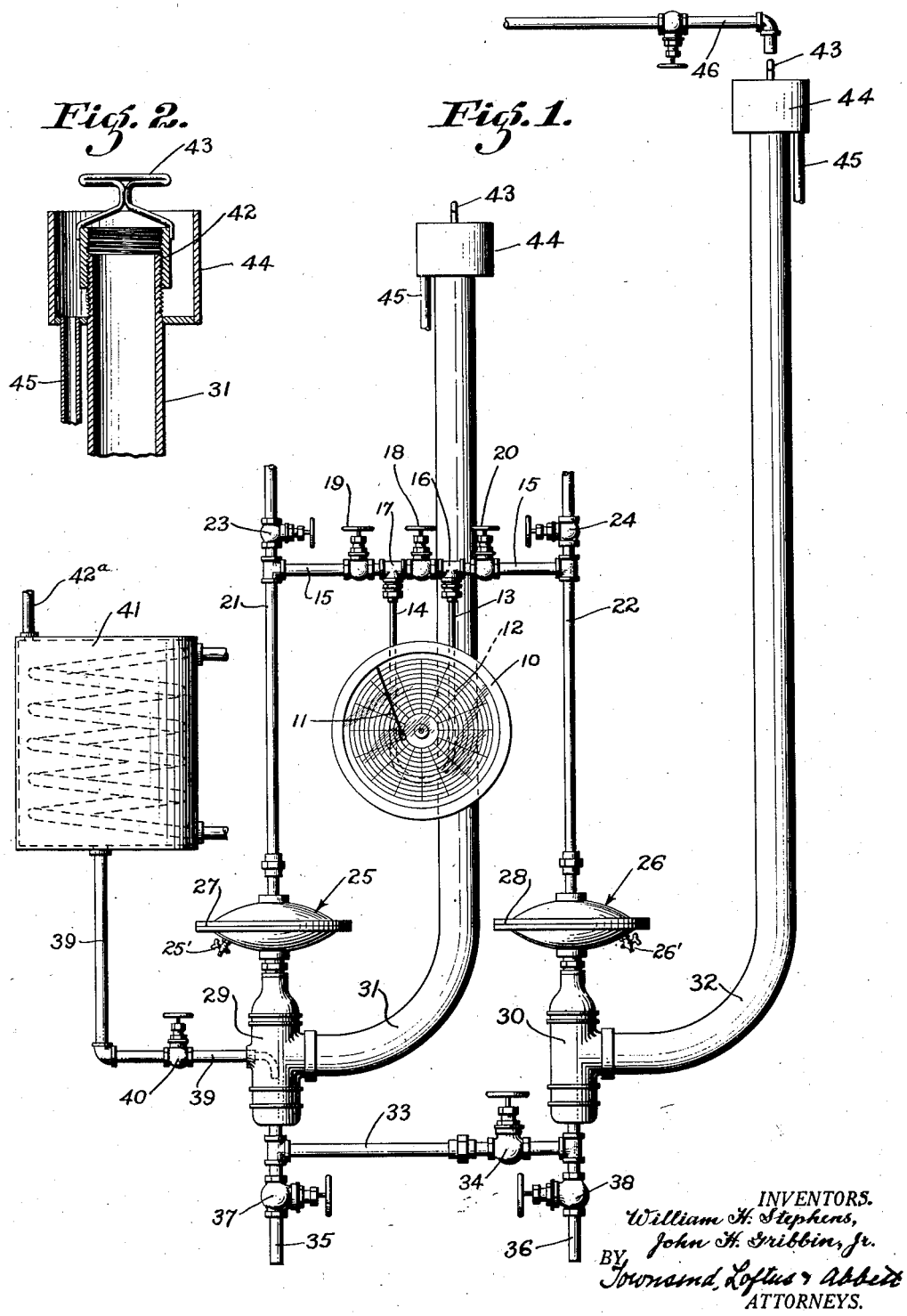

1,888,577

UNITED STATES PATENT OFFICE

WILLIAM H. STEPHENS AND JOHN H. GRIBBIN, JR., OF CROCKETT, CALIFORNIA

DENSITY MEASURING APPARATUS

Application filed March 9, 1927. Serial No. 174,055.

This application relates to a density measuring apparatus.

In the operation of various industrial plants in which apparatus is provided through which liquids are continuously flowing, it is desirable to be able to constantly ascertain and to keep a continuous record of the density of the liquids. This is particularly true in the operation of a sugar refining plant in which sugar liquors of different density are constantly flowing through the plant, and it is necessary for accurate data to be obtained as to the density of these liquids at all times.

It is the object of the present invention, therefore, to provide means operating in conjunction with the flow pipes of the apparatus whereby the density of the liquids flowing through the pipes may be constantly recorded, and which will accurately and continuously operate irrespective of the density of the liquid.

The present invention contemplates the use of a recording chart and of means operating in conjunction therewith whereby the density of the liquid flowing through a pipe may be constantly recorded.

The invention is illustrated by way of example in the accompanying drawing, in which—

Figure 1 is a view showing the apparatus with which the present invention is concerned.

Figure 2 is a view in enlarged central vertical section showing the weir collar construction of the columns.

Referring more particularly to the drawing:

10 indicates a recording device of any desired construction, and although it has been found that the type of recording device embodying a U-tube carrying a suitable float, and by which float a stylus arm, 11, may be operated, is satisfactory, practically any type of recording instrument may be used which is actuated in response to a difference in pressure existing between two connections therewith. In describing our invention, we have shown by way of illustration an instrument having a U-tube carrying a suitable fluid which will influence the mechanism of the instrument when the pressures exerted upon the ends of the U-tube are unequal. Such an instrument is illustrated in United States Patent Number 1,396,560 to Dickinson. The U tube indicated at 12 by dotted lines in Figure 1 is connected with pipes 13 and 14. These pipes are connected to horizontal supply pipes 15, by fittings, 16 and 17. Interposed between the fittings 16 and 17 is a cut-off valve, 18, and disposed between the fittings and the outer ends of the pipes are valves 19 and 20. The outer ends of pipes 15 are connected with pipes 21 and 22. These pipes are provided with water supply cut-off valves, 23 and 24, respectively, which may be connected with any source of water supply. The pipes 21 and 22 extend downwardly to diaphragm structures 25 and 26, having air vents 25' and 26'. These structures include opposite convexed housing members between which diaphragms 27 and 28 are disposed. The bottom chambers of the diaphragm structures 25 and 26 are connected with T members 29 and 30, of columns 31 and 32, respectively. The column 31 extends horizontally and then turns upwardly and may be designated as the "dense liquid column." The column 32 is of the same shape as 31 and extends substantially parallel thereto and may be designated as the "standard liquid column." The T's 29 and 30 are closed at their lower ends and connected by a cross pipe, 33, in which a valve, 34, is positioned. Drain pipes 35 and 36, extend downwardly from the T's and are provided with drain valves, 37 and 38, respectively. Leading into the dense liquid T 29 is a supply pipe, 39, controlled by a valve, 40. This pipe communicates with a heating tank, 41, to which the dense liquid is delivered via supply pipe 42a. Suitable heating means is provided in the tank, such for example, as a steam heating coil shown in the drawing, and which is provided with an automatic temperature regulator.

Referring particularly to Figure 2 of the drawing, the construction of the upper ends of the columns, 31 and 32, may be readily understood. It is to be understood that the column 31 is provided for the dense liquid to be measured, and that the column 32 is to be provided with another liquid, as, for example, water. Usually the recording instrument is a differential pressure recorder consisting essentially of a U tube containing mercury, one leg of the U tube containing a float resting on the mercury column and operating a stylus arm which indicates or records the changes in differential pressure. If the pressure from the column containing the liquid being tested increases, indicating an increased density, this change is transmitted to the mercury in the U tube and is balanced by a change in their relative heights. At the same time the change in position of the float indicates or records the change on the instrument. A similar reverse action takes place when the density of the liquid being tested diminishes.

The relative height adopted for the two columns is merely a matter that depends on the type of recording instrument used and on the minimum density of liquid which it is desired to measure. For example if it is desired to measure the density of liquids ranging between 1.2 and 1.3 specific gravity it is desirable that the height of column 32 be enough greater than that of column 31 that the pressures exerted by the two columns of liquid against the diaphragms 27 and 28 respectively, will be equal when the specific gravity of the liquid being tested is 1.2. Under these conditions the mercury in the U tube of the recording instrument remains in balance, that is, it rests in the same position as it would if no pressure were exerted from either column. If the specific gravity of the liquid being tested is greater than 1.2, the pressure exerted by the liquid in column 31 is greater than that in column 32 and the mercury in the U tube of the instrument is displaced sufficiently to bring about a balance. If the specific gravity of the liquid being tested falls below 1.2 then the density would be below the lowest reading of the instrument and therefore would not be indicated. However, the range of the differential pressure recorder or indicator used and the relative heights of the two columns may always be selected so as to cover the range of conditions that it is desired to measure. In order, however, to insure that there is an accurate equilibrium of pressure between the liquid contained in the two columns 31 and 32 at the lowest reading of the scale, means have been provided for accurately determining and continuously maintaining the liquid in the two columns at constant level and in constant volume. This, as shown in Figure 2, consists of an adjustable weir collar or sleeve, 42, which is threaded on to the outside of the upper end of the columns, one on each column. A handle, 43, is rigidly secured to the collar to permit it to be conveniently rotated. An overflow launder, 44, is disposed around the upper end of the pipe and is fitted with an overflow drain pipe 45. The column, 32, is provided with a liquid feed pipe, 46 by which liquid may be constantly conducted into the upper end of the column after which it may overflow into the launder while maintaining a constant level of the liquid as determined by the adjustment of the weir sleeve, 42.

In operation of the present invention, the columns 31 and 32 are drained. This is brought about by opening the valves 37 and 38. Valves 23 and 24 are then opened to permit water or other liquid of constant density to flow into the pipes 21 and 22. At the same time the valves 18, 19 and 20 are all opened. This will cause the pipes 21 and 22 to fill; also the pipe 15 and the pipes 13 and 14, which connect with the legs of the U-tube 12. Thus an equilibrium of liquid will be established on the surface of the mercury in the legs of the U-tube, as well as upon the diaphragms 27 and 28 of the diaphragm structures, 25 and 26. The stylus on the arm 11 will, at this time, stand at zero. After the pipes 21, 22 and 15 have been filled, the valves, 18, 23 and 24 may be closed. The valve 34 of the communicating pipe 33 may then be opened, while drain valves 37 and 38 are closed. Water may then be poured in the upper ends of the columns 31 and 32 to any desired level; e. g., until the level at the top of the column 31 has been reached in both columns. At this time the air vents 25' and 26' are opened until all the air in the lower portion of the diaphragm is exhausted, after which the air vents are closed. Due to the fact that the columns are communicating at their lower ends through pipe 33, the level of the water in the two columns will be the same and at this time the stylus arm 11 may be further checked to assure that the stylus stands at zero under these conditions. The valve 34 may then be closed and valve 37 is then opened. This will cause all of the water to drain from the column 31. After all of this liquid has drained from the column 31, the valve 37 is closed and the valve 40 is opened in the supply pipe 39. This permits the dense liquid to flow into the T 29 of the dense liquid column 31. At the same time the lower portion of the diaphragm structure 25 is again vented as described above.

Attention is directed to the fact that the outlet end of the pipe 39 is turned downwardly within the T 29 so that abnormal pressure will not be exerted against the under face of the diaphragm 27 in the diaphragm structure 25. The dense liquor delivered to the column 31 will gradually build up until it overflows the weir sleeve 42. This will constantly take place so that a constant level in the column 31 will be maintained. The water supply pipe 46 may then be placed in communication with the upper end of column 32 to build the column 32 up to a desired level above that of the level of the liquor in column 31. It will be evident that microscopic adjustment of the level of the liquids in the two columns may be effected by adjustment of the weir sleeves 42, and that thereafter the constant delivery of liquid to the two columns will insure that the recording device will constantly record minute variations in density of the liquids in the two columns. It will also be appreciated that the density of the liquid recorded might vary under different temperature conditions, and for that reason the liquid to be measured is passed through the heating tank 41 so that a constant temperature may be maintained.

It will thus be seen that the device here disclosed is simple in construction, having practically no moving parts other than the parts of the recording device and insuring that the recording device may be operated in a simple and direct manner without possibility of in anywise rendering the recording device inaccurate due to clogging or other action of the dense liquid, and it will be further noted that minute adjustment may be readily made with only brief interruption in the operation of the apparatus.

Attention is particularly directed to the fact that the apparatus is rendered especially accurate and sensitive, due to the provision that the dense liquid shall flow into the bottom of the dense liquid column and will build up from the bottom.

While we have shown the preferred form of our invention as now known to us, it will be understood that various changes might be made in the combination, construction and arrangement of parts by those skilled in the art without departing from the spirit of the invention as claimed.

Having thus described our invention, what we claim and desire to secure by Letters Patent is:

1. A device of the class described including a density measuring apparatus comprising a pair of diaphragm divided compartments, liquid column supporting pipes each connected to one of said compartments at one side of the diaphragm contained therein, a conduit connecting said compartments at the other side of said diaphragms, and a liquid within said conduit movable in response to the movements imparted to said diaphragms due to a difference in the pressures exerted by said liquid columns.

2. A device of the class described, including a density measuring apparatus comprising a vertically extending liquid column supporting pipe adapted to contain a liquid of uniform specific gravity, a chamber connected to the lower end of said pipe and having a diaphragm one side of which is exposed to the pressure exerted by said liquid column, a second vertically extending liquid column supporting pipe adapted to contain a column of flowing liquid having a variable specific gravity, a second chamber connected to the lower end of said second pipe and having a diaphragm exposed on one side to the pressure exerted by said second liquid column, and a connection between said chambers affording communication with the spaces at the other sides of said diaphragms.

3. A device of the class described, including a density measuring apparatus comprising a pair of vertically extending cylinders adapted to contain columns of liquid, one of said cylinders containing a liquid of uniform specific gravity and the other of said cylinders containing a liquid of variable specific gravity, connections whereby said liquids will be continuously supplied to said columns to maintain them at their full height, means at the top of said columns for increasing and decreasing their heights, whereby liquid columns of equal pressure may be obtained irrespective of their specific gravity, and means connected with the bottom of said columns and actuated in response to any unbalance between said columns due to a change in the specific gravity of said variable specific gravity liquid after a balance has been established by said means at the top of said columns.

4. A density measuring apparatus comprising a pair of liquid column supporting members, one of said members being adapted to contain a liquid having a standard specific gravity and the other a liquid having a specific gravity to be measured, a housing connected to said member for standard liquid, a housing connected to the said member for liquid to be measured, diaphragms in each housing and responsive respectively to the pressures exerted by said liquids on one side thereof, and means for transmitting the pressure on said diaphragms to a suitable differential pressure measuring device.

5. A density measuring apparatus comprising a pair of liquid column supporting members, one of said members being adapted to contain a liqiud having a standard specific gravity and the other a liquid having a specific gravity to be measured, a housing connected to said member for standard liquid, a housing connected to the said member for liquid to be measured, diaphragms in each housing and responsive respectively to the pressures exerted by said liquids on one side thereof, and a conduit connecting said housings at the other sides of said diaphragms, liquid filling said conduit and in contact with said other sides of said diaphragms, and transmitting the pressure on said diaphragms to a suitable differential pressure measuring device connected to said conduit and operable by the pressure differential of said liquids.

6. A density measuring apparatus comprising a pair of liquid column supporting members, one of said members being adapted to contain a liquid having a standard specific gravity and the other a liquid having a specific gravity to be measured, a housing connected to said member for standard liquid, a housing connected to the said member for liquid to be measured, diaphragms in each housing and responsive respectively to the pressures exerted by said liquids on one side thereof, a conduit connecting said housings at the other sides of said diaphragms, liquid filling said conduit and in contact with said other sides of said diaphragms, said liquid transmitting the pressure on said diaphragms to a suitable differential pressure measuring device connected to said conduit at two points, and operable by the pressure differential of said liquids, and a valve in said conduit between said points.

WILLIAM H. STEPHENS.
JOHN H. GRIBBIN, Jr.